(12) United States Patent
Parikh et al.

(10) Patent No.: US 10,756,900 B2
(45) Date of Patent: Aug. 25, 2020

(54) NON-REPUDIATION PROTOCOL USING TIME-BASED ONE-TIME PASSWORD (TOTP)

(71) Applicant: Hand Held Products, Inc., Fort Mill, SC (US)

(72) Inventors: Chirant Parikh, Cedar Rapids, IA (US); Jeff Sailors, Solon, IA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 376 days.

(21) Appl. No.: 15/718,112

(22) Filed: Sep. 28, 2017

(65) Prior Publication Data
US 2019/0097804 A1    Mar. 28, 2019

(51) Int. Cl.
*H04L 9/32* (2006.01)
*H04L 9/06* (2006.01)
*H04L 9/08* (2006.01)

(52) U.S. Cl.
CPC .......... *H04L 9/3228* (2013.01); *H04L 9/0643* (2013.01); *H04L 9/0863* (2013.01); *H04L 9/0869* (2013.01); *H04L 9/0872* (2013.01); *H04L 9/3236* (2013.01); *H04L 9/3247* (2013.01); *H04L 9/3297* (2013.01)

(58) Field of Classification Search
CPC ... H04L 9/3228; H04L 9/0869; H04L 9/0872; H04L 9/3236; H04L 9/0863; H04L 9/3297; H04L 9/3247; H04L 9/0643
See application file for complete search history.

(56) References Cited

U.S. PATENT DOCUMENTS

| | | |
|---|---|---|
| 6,832,725 B2 | 12/2004 | Gardiner et al. |
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |

(Continued)

FOREIGN PATENT DOCUMENTS

| | | |
|---|---|---|
| WO | 2013163789 A1 | 11/2013 |
| WO | 2013190169 A1 | 12/2013 |

*Primary Examiner* — Mohammed Waliullah
(74) *Attorney, Agent, or Firm* — Alston & Bird LLP

(57) ABSTRACT

A method to validate delivery of a document using a non-repudiation protocol and a time-based one time password (TOTP) for encryption is described. The method includes a one-time registration of an application with a trusted third party, wherein the trusted third party provides a seed to a first device of a first user. The first user receives and accepts a document from a second user. The first device generates the TOTP based on the seed. Using the TOTP as an encryption key, the first device computes a current hash. The delivery of the document can be validated by a second device of a second user based on a comparison of the current clock time and GPS coordinates (optional) of first device as compared to the associated values of the second device. The second device stores the document, first device's computed hash, and current clock time.

20 Claims, 4 Drawing Sheets

(56) References Cited

U.S. PATENT DOCUMENTS

| | | |
|---|---|---|
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |

(56) References Cited

U.S. PATENT DOCUMENTS

| | | |
|---|---|---|
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| D737,321 S | 8/2015 | Lee |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,183,552 B2 | 11/2015 | Kauniskangas et al. |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| D754,205 S | 4/2016 | Nguyen et al. |
| D754,206 S | 4/2016 | Nguyen et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| 9,319,548 B2 | 4/2016 | Showering et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,304 B2 | 7/2016 | Chang et al. |
| 9,390,596 B1 | 7/2016 | Todeschini |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,487,113 B2 | 11/2016 | Schukalski |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |

(56) References Cited

U.S. PATENT DOCUMENTS

| | | |
|---|---|---|
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 10,402,797 B2 * | 9/2019 | Efroni .............. H04L 9/3228 |
| 10,469,262 B1 * | 11/2019 | Schroeder .......... H04L 9/3239 |
| 2007/0063048 A1 | 3/2007 | Havens et al. |
| 2007/0067634 A1 * | 3/2007 | Siegler ................ G06F 21/31 713/171 |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0036019 A1 * | 2/2012 | Broumand ........ G06Q 30/0269 705/14.66 |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0194692 A1 | 8/2012 | Mers et al. |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2013/0332996 A1 | 12/2013 | Fiala et al. |
| 2014/0001267 A1 | 1/2014 | Giordano et al. |
| 2014/0002828 A1 | 1/2014 | Laffargue et al. |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0191684 A1 | 7/2014 | Valois |
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0332590 A1 | 11/2014 | Wang et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |

(56) References Cited

U.S. PATENT DOCUMENTS

| | | |
|---|---|---|
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0178523 A1 | 6/2015 | Gelay et al. |
| 2015/0178537 A1 | 6/2015 | El et al. |
| 2015/0178685 A1 | 6/2015 | Krumel et al. |
| 2015/0181109 A1 | 6/2015 | Gillet et al. |
| 2015/0186703 A1 | 7/2015 | Chen et al. |
| 2015/0199957 A1 | 7/2015 | Funyak et al. |
| 2015/0210199 A1 | 7/2015 | Payne |
| 2015/0212565 A1 | 7/2015 | Murawski et al. |
| 2015/0213647 A1 | 7/2015 | Laffargue et al. |
| 2015/0220753 A1 | 8/2015 | Zhu et al. |
| 2015/0220901 A1 | 8/2015 | Gomez et al. |
| 2015/0227189 A1 | 8/2015 | Davis et al. |
| 2015/0236984 A1 | 8/2015 | Sevier |
| 2015/0239348 A1 | 8/2015 | Chamberlin |
| 2015/0242658 A1 | 8/2015 | Nahill et al. |
| 2015/0248572 A1 | 9/2015 | Soule et al. |
| 2015/0254485 A1 | 9/2015 | Feng et al. |
| 2015/0261643 A1 | 9/2015 | Caballero et al. |
| 2015/0264624 A1 | 9/2015 | Wang et al. |
| 2015/0268971 A1 | 9/2015 | Barten |
| 2015/0269402 A1 | 9/2015 | Barber et al. |
| 2015/0288689 A1 | 10/2015 | Todeschini et al. |
| 2015/0288896 A1 | 10/2015 | Wang |
| 2015/0310243 A1 | 10/2015 | Ackley |
| 2015/0310244 A1 | 10/2015 | Xian et al. |
| 2015/0310389 A1 | 10/2015 | Crimm et al. |
| 2015/0312780 A1 | 10/2015 | Wang et al. |
| 2015/0326395 A1 | 11/2015 | Lemke et al. |
| 2015/0327012 A1 | 11/2015 | Bian et al. |
| 2016/0014251 A1 | 1/2016 | Hejl |
| 2016/0025697 A1 | 1/2016 | Alt et al. |
| 2016/0026838 A1 | 1/2016 | Gillet et al. |
| 2016/0026839 A1 | 1/2016 | Qu et al. |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0125873 A1 | 7/2016 | Braho et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0316190 A1 | 7/2016 | McCloskey et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |

(56) References Cited

U.S. PATENT DOCUMENTS

| | | |
|---|---|---|
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0199266 A1 | 7/2017 | Rice et al. |
| 2017/0200108 A1 | 7/2017 | Au et al. |
| 2017/0200275 A1 | 7/2017 | McCloskey et al. |
| 2018/0097758 A1* | 4/2018 | Benson ................ H04L 51/18 |
| 2019/0057209 A1* | 2/2019 | Dyer ................... G06Q 10/04 |
| 2019/0058459 A1* | 2/2019 | Khan ................... H03J 7/186 |

* cited by examiner

TOTP = Time-based One-time Password
TTP = Impartial Trusted Third-Party
TPA = Trading Partner A, the originator of the document = second device
TPB = Trading Partner B, the receiver of the document = first device

NON-REPUDIATION PROTOCOL USING TIME-BASED ONE-TIME PASSWORD (TOTP)

FIELD OF THE INVENTION

The present invention relates to methods to validate delivery of documents between two parties, and more particularly, validating delivery of documents using a non-repudiation protocol and a time-based one-time password for encryption.

BACKGROUND

Generally speaking business records (invoices, etc.) are commonly exchanged as paper artifacts. One example would be a consumer packaged goods vendor route sales-person having a portable computing device and printer. Traditionally, the sales-person would print paper invoices containing a record of the products delivered to a retail store. The retail store receiving clerk may "accept" the invoice by stamping the invoice pages with a unique physical inked stamp (and often signing/initialing the stamped area) so that the delivery person has a stamped/signed copy of the invoice to keep for their records.

Therefore, a need exists whereby the paper and inked stamp are obviated, and the documents can be exchanged digitally. The challenge is to provide a substitute method for the paper/stamp method of validating the delivery of a document.

SUMMARY

Accordingly, in one aspect, the present invention embraces a method to validate delivery of a document using a non-repudiation protocol and a time-based one time password (TOTP) for encryption. The method includes a one-time registration of an application with a trusted third party, wherein the trusted third party provides a seed to a first device of the first user. The first user receives and accepts a document from a second user. The first device generates the TOTP based on the seed. Using the TOTP as an encryption key, the first device computes a current hash. The delivery of the document can be validated by a second device of the second user based on a comparison of the current clock time and GPS coordinates (optional) of first device as compared to the associated values of the second device. The second device stores the document, first device's computed hash, and current clock time. As discussed herein, the term "validation" is equivalent to the term "verification".

In an exemplary embodiment, a method of implementing a non-repudiation protocol by a first device comprises registering, by the first device, an application associated with the first device at a trusted third party. The application registration is a one-time event. The method further includes receiving, by the first device, a seed that was generated by the trusted third party based in part on a seed time; receiving, by the first device, a document from a second device; displaying, by the first device, the received document to a first user. The first user is associated with the first device. The capabilities of the first device and the second device are equivalent, and the first device and second device utilize the same application.

In response to receiving an input from the first user indicating acceptance of the document: computing, by the first device, a time-based one-time password based in part on a current clock time of the first device and the seed; computing, by the first device, a first hash of the document using the time-based one-time password as an encryption key; and transmitting, by the first device, to the second device the first hash, the current clock time the first hash was computed by the first device, and optionally GPS coordinates of the first device. In response to the second device assuming that the current clock time and optionally the GPS coordinates of the second device are within a threshold of the current clock time and optionally the GPS coordinates of the first device, storing, by the second device, the first hash, the current clock time the first hash was computed by the first device, and optionally the GPS coordinates of the first device.

In response to the second device not assuming that the current clock time and optionally the GPS coordinates of the second device are within the threshold of the current clock time and optionally the GPS coordinates of the first device, measuring, by the second device, to verify that the current clock time and optionally the GPS coordinates of the second device are within the threshold of the current clock time and optionally the GPS coordinates of the first device. In response to the second device failing to verify that the current clock time is within the threshold of the current clock time of the first device, calibrating, by the first device, the device clock time of the first device.

The method further comprises, in response to receiving an input from the first user indicating non-acceptance of the document, transmitting, by the first device, the document to the second device to request a correction. The method further comprises, in response to the current clock time of the first device not being within the threshold of a current clock time of the second device, receiving, by the first device, a rejection from the second device. And, the method further comprises, in response to the GPS coordinates of the first device not being within the threshold of a GPS coordinates of the second device, receiving, by the first device, a rejection from the second device.

The method further comprises: disputing, by the first device, reception of the document or asserting that the document has subsequently been altered; transmitting, by the first device, an indication of the dispute or assertion to the trusted third party via the second device, causing the trusted third party to: (1) receive, from the second device, an identity of the first device, the document, the first hash of the first device, and first device's reported time the first hash was computed; (2) compute another time-based one-time password of the first device based in part on the reported time the first hash was computed using the seed provided to the first device; (3) hash the document with the another time-based one-time password to generate a second hash; (4) compare the first hash to the second hash; and (5) determine that the document provided by the second device is legitimate if the first hash and the second hash are equal.

The method further comprises: transmitting, by the first device, an indication of the dispute or assertion to the trusted third party via the second device, causing the trusted third party to determine that the document provided by the second device is not legitimate if the first hash and the second hash are not equal. And the method comprises generating a digital signature based on the first hash. The document is acceptable when the first user manually determines accuracy of content of the document. After registration neither the first device nor the second device accesses the trusted third party unless and until there is a dispute.

In another exemplary embodiment, a method of implementing a non-repudiation protocol by a first device comprises receiving, by the first device, a document from a second device. In response to receiving an input from a first user indicating acceptance of the document: (1) computing a time-based one-time password based in part on a current clock time and a seed; (2) computing a hash of the document using the time-based one-time password as an encryption key; and (3) transmitting the hash, and the current clock time the hash was computed to the second device, wherein, the second device stores the document, the hash, and the current clock time the hash was computed by the first device.

The method further comprises registering, by the first device, an application at a trusted third party; and receiving, by the first device, the seed that was generated by the trusted third party based in part on a seed time. The application registration is a one-time event. The method further comprises receiving, by the first device, a verification from the second device that the first device's current clock time is within a threshold of the second device's current clock time. Further, the method includes transmitting, by the first device, GPS coordinates to the second device; and receiving, by the first device, a verification from second device that the GPS coordinates of the first device are within a threshold of second device's current GPS coordinates.

The method also comprises, in response to receiving an input from the first user indicating non-acceptance of the document, transmitting, by the first device, the document to second device to request a correction. If the current clock time of the first device is not within a threshold of the current clock time of the second device, not storing the document, the hash, and the current clock time the hash was computed by the first device. The method also includes generating a digital signature based on the first hash. And, the method includes calibrating a clock time of the first device using a phone time/network time protocol. The document is acceptable when the first user manually determines an accuracy of content of the document.

In yet another exemplary embodiment, a method of implementing a non-repudiation protocol by a first device comprises: (1) receiving a request for a document from a second device; (2) transmitting a document to the second device; (3) receiving a hash, and a current clock time the hash was computed by the second device, wherein, the second device computes a time-based one-time password based in part on the current clock time and a seed that was received from a trusted third party, and wherein, the second device computes the hash of the document using the time-based one-time password as an encryption key; (4) verifying that the current clock time of the second device is within a threshold of a current clock time for the first device; and (5) storing the document, the hash, and the current clock time the hash was computed by the second device.

The first device and the second device are both capable of communicating with each other by: utilizing the same application to register and obtain the seed from the trusted third party, and creating a unique ID each time they send a communication to the other party, wherein, the unique ID is based on hash information and current clock time information. If the first device or the second device initiates a dispute, the initiator of the dispute engages the trusted third party to determine whether the document is legitimate.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

In an exemplary embodiment.

In an exemplary embodiment.

In an exemplary embodiment.

DETAILED DESCRIPTION

Figure 1:
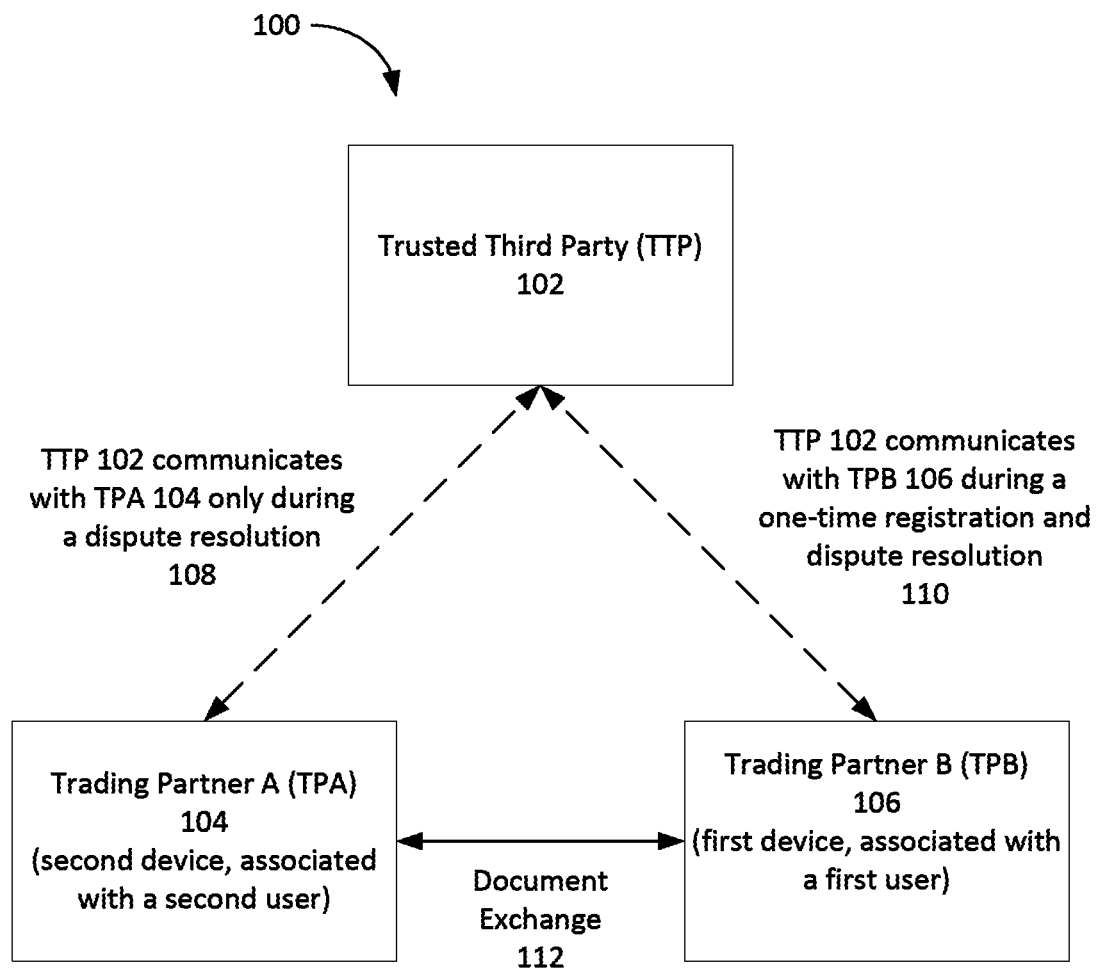
FIG. 1 illustrates a document exchange between two trading partners, supported by a trusted third party.

The present invention embraces a method to validate delivery of a document using a non-repudiation protocol and a time-based one time password (TOTP) for encryption.

Business partners exchanging business records (invoices, purchase orders, etc.) digitally/electronically can require a method whereby the transmission/receipt of the document and the integrity of the document can be provably verified by a third-party (usually a judge or arbitrator), and neither trading partner can falsely claim non-receipt/non-transmission or tampering after the document has been exchanged and accepted. This barrier to false claims is commonly referred to as "non-repudiation".

Current non-repudiation protocols can require extensive event logging, time synchronization, public/private key management, and real-time interaction with a trusted third-party. For business document exchanges involving lesser monetary (or other) values, a lighter-weight non-repudiation method may be desirable to better match the security requirements with the business need.

The present invention can reduce the infrastructure and management burden of implementing a non-repudiation protocol. Unlike prior art, the present invention can offer the following benefits: 1) there is no need for an on-line connection to a trusted third-party (TTP) during document exchange, 2) there is no need to distribute (and manage) private encryption keys to trading partner devices, and 3) there is no need for sophisticated/secure time/clock synchronization. Current art can require an on-line interaction with a TTP for each document exchange. The present invention may only require a one-time setup interaction with the TTP to configure each trading partner. Thereafter, interaction with the TTP may not be required during document exchange, and may only be required in the event of a trading partner dispute (i.e. if one of the trading partners claims non-receipt/non-transmission or document tampering).

Instead of static private encryption keys, a time-based password algorithm may be used to generate temporal encryption keys to be used during each document exchange. The present invention describes the novel use of TOTP algorithms as the private key generation mechanism in the general non-repudiation process.

Non-repudiation protocols aim at preventing parties in a communication from falsely denying having taken part in that communication; for example, a non-repudiation protocol for digital certified mail can ensure that neither the sender can deny sending or transmitting the message, nor the receiver can deny receiving it. Some aspects of Non-repudiation protocols are disclosed in the following paragraphs.

Non-repudiation of Origin (NRO) or Evidence of Origin is supplied by the originator. NRO provides the recipient with proof of origin and guards against the originator of a message falsely denying having sent the message.

Non-repudiation of Receipt (NRR) or Evidence of Receipt (EOR)—supplied by the recipient, which guards against the recipient of a message falsely denying having received the message.

Non-repudiation of Delivery (NRD)—supplied by the delivery agent, this provides the originator of the message with evidence that the message has been delivered to the recipient.

Non-repudiation of submission (NRS)—supplied by the delivery agent, which provides the originator of the message with evidence that the message has been submitted for delivery to the recipient:

NRO=sSA(fNRO; B; L; C)
NRR=sSB(fNRR; A; L; C)
sub K=sSA(fSUB; B; L; K)
con K=sST (fCON; A; B; L; K)
1: A ! B: fNRO; B; L; C; NRO
2: B ! A: fNRR; A; L; NRR
3: A ! TTP: fSUB; B; L; K; sub K
4: B $ TTP: fCON; A; B; L; K; con K
5: A $ TTP: fCON; A; B; L; K; con K In step 1, A contacts B and sends the encrypted message. In step 2, B confirms receipt, but cannot read the message. In step 3, A submits the message key to a trusted third party; sub K is the proof of submission of K. The trusted third party stores the tuple (A; B; L; K; con K) in some read-only directory accessible to the public; con K is the confirmation of K issued by the TTP. Then, in step 4, B gets the key while, in step 5, principal A confirms that B can indeed get the key. The last two steps can be performed in any order.

TOTP is a time-based one time password, a temporary passcode, generated by an algorithm from a secret key (e.g. a seed provided by TTP) and current time. The algorithm that generates this passcode uses the current time of a day as one of its factors ensuring that each passcode is unique. Algorithm combines secret key with current timestamp using cryptographic hash function to generate one-time password. TOTP are commonly used for two-factor authentication like Google Authenticator Application, Amazon web services (AWS Virtual MFA) etc.

A hash of the document can be utilized to generate a digital signature. Digital signatures can provide the added assurances of evidence to origin, identity, and status of an electronic document, transaction or message, as well as acknowledging informed consent by the signer. Digital signatures are based on public key cryptography, also known as asymmetric cryptography. Using a public key algorithm such as RSA, one can generate two keys that are mathematically linked: one private and one public. To create a digital signature, signing software (such as an email program) creates a one-way hash of the electronic data to be signed. The private key is then used to encrypt the hash. The encrypted hash—along with other information, such as the hashing algorithm—is the digital signature.

For the present invention, the validation process can be described with the following elements: TOTP=Time-based One-time Password, TTP=Impartial Trusted Third-Party, TPA=Trading Partner A, the originator of the document (second user), TPB=Trading Partner B, the receiver of the document (first user). As used herein, TPA is a device that is associated with a user, e.g., second user. TPB is a device that is associated with a user, e.g., first user. Also, as used herein, the term validation" is equivalent to the term "verification".

Both TPA and TPB can be using computer applications (usually on mobile devices) that contain the document review, exchange, and acceptance logic. The communication between the devices can be accomplished using a variety of industry standard file transfer or other data communication protocols. The present invention may not require any special cryptographic hardware—it can use only general computing hardware.

The validation method can include a one-time application registration with TTP system being initiated by TPB: a) TPB uses the application to log into the TTP-provided server application using pre-arranged credentials. b) The TTP notes the current time and creates an initial encryption "seed" for TPB (known only to TTP and TPB) and sends the seed value to TPB to be securely stored on the computing device used by TPB; c) This operation can be performed only one time as an initial setup step, and may not be required for any subsequent document exchange.

After the one-time initial set-up, the validation method can include the TPA electronically sending or transmitting a document to TPB: a) a user of TPB reviews the document for accuracy and, if OK, the user of TPB proceeds to digitally accept the document; b) TPB computes the current TOTP based in part on the current time and the initial seed; c) TPB computes a cryptographic hash of the document using the TOTP as the encryption key; d) TPB sends the computed hash and its current clock time (and optionally, TPB's current GPS coordinates) back to TPA; e) TPA can optionally validate that TPB's current time and GPS coordinates are within a reasonable threshold of TPA's current time and GPS location and reject the validation. If they are not validated, TPB can calibrate its device time using the Phone time/NTP (Network Time Protocol) and ensure GPS location services are turned on. TPB also can use Assisted GPS (AGPS) for better accuracy; f) TPA stores the original document, TPB's computed hash, and TPB's reported clock time and GPS coordinates.

In the case where the user of TPB later claims to not have received the document or that the document has subsequently been altered (or as a periodic audit), the following method can be used to resolve the dispute between the user of TPB and the user of TPA: 1) TPA sends TPB's identity, the original document, TPB's computed hash, and TPB's reported time to the TTP. In a more formal legal setting, this information may be provided to a judge or arbitrator for transmission to the TTP; 2) The TTP attempts to validate the document 2a) The TTP computes the TOTP for TPB as of the reported time of the document exchange; 2b) The TTP hashes the supplied document with the computed TOTP; 2c) The TTP compares the computed hash to the hash supplied by TPA (as originally supplied to TPA by TPB during the original document exchange; 3) The TTP reports the results of the hash comparison to all parties.

If the hashes match, then depending upon the length of the TOTP (the length having been configured to match the desired level of cryptographic strength), it can be cryptographically infeasible (a term in the art) for TPA to have forged a document having the same cryptographic hash as the original document.

In an exemplary embodiment 100, FIG. 1 illustrates a document exchange between trading partner A 104 (TPA 104) and trading partner B 106 (TPB 106), supported by a trusted third party 102 (TTP 102). TPB 106 communicates with TTP 102 during a one-time registration and obtains an initial "seed" to support the calculation of a time-based one-time password (TOTP). (FIG. 1, 110) After the one-time registration, TPA 104 transfers a document to TPB 106 in document exchange 112. TPB 106 computes a current TOTP based on the "initial seed" and a current time. Then, TPB 106 computes a hash of the document using TOTP as the encryption key, and transmits to TPA 104 the hash, current clock time and GPS coordinates.

TTP 102 communicates with TPA 104 only during a dispute resolution. (FIG. 1, 108). TTP 102 does not communicate with TPA 104 during the document exchange 112 and validation. TTP 102 communicates with TPB 106 during a one-time registration and a dispute resolution. (FIG. 1, 110) Relative to document exchange 112, TPA 104 and TPB 106 can utilize the same application and can have a unique identity and unique login.

Figure 2A:
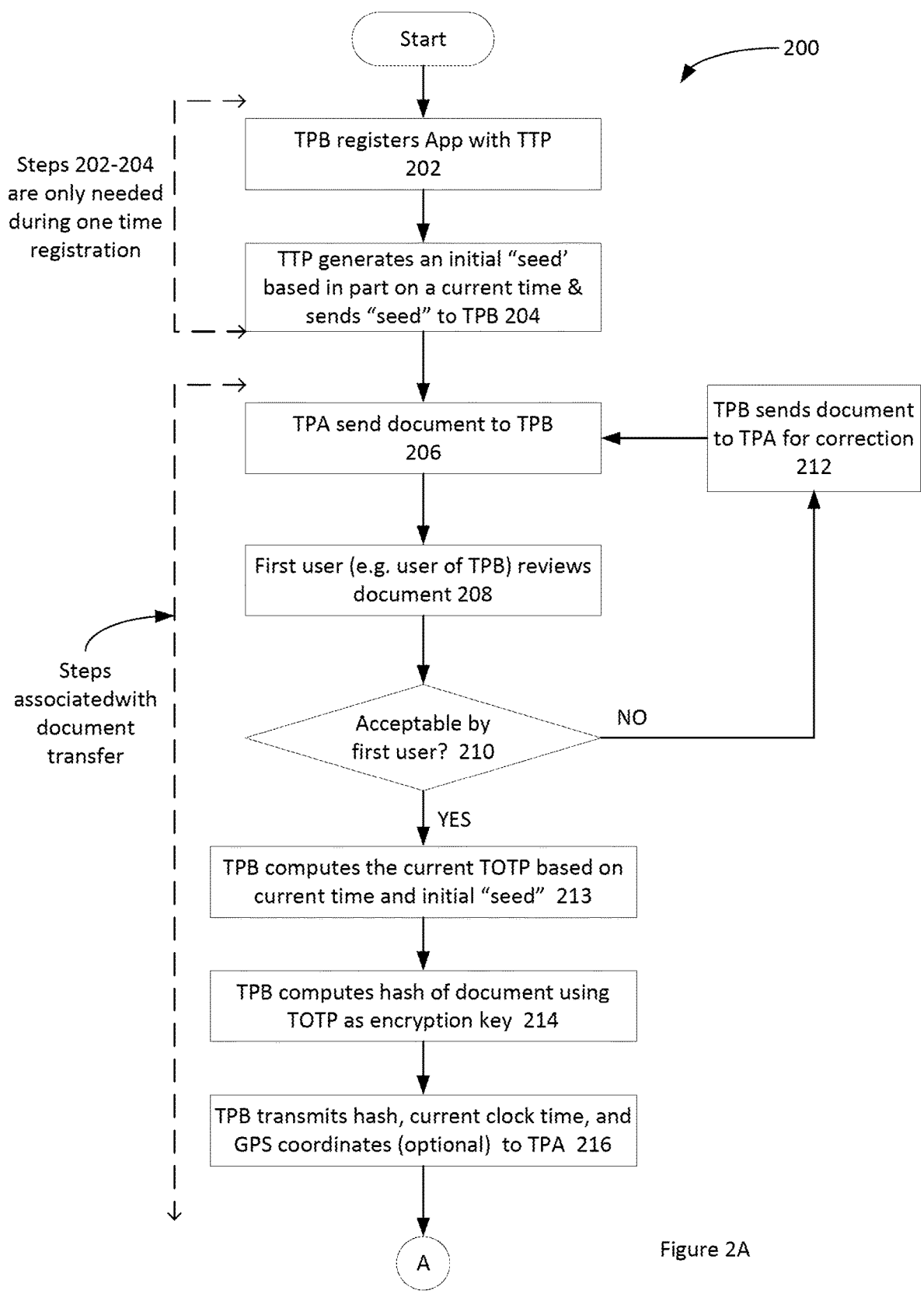
FIGS. 2A and 2B illustrate a flowchart for a method of a document exchange and validation based on a non-repudiation protocol and a time-based one time password (TOTP) for encryption.
Figure 2B:
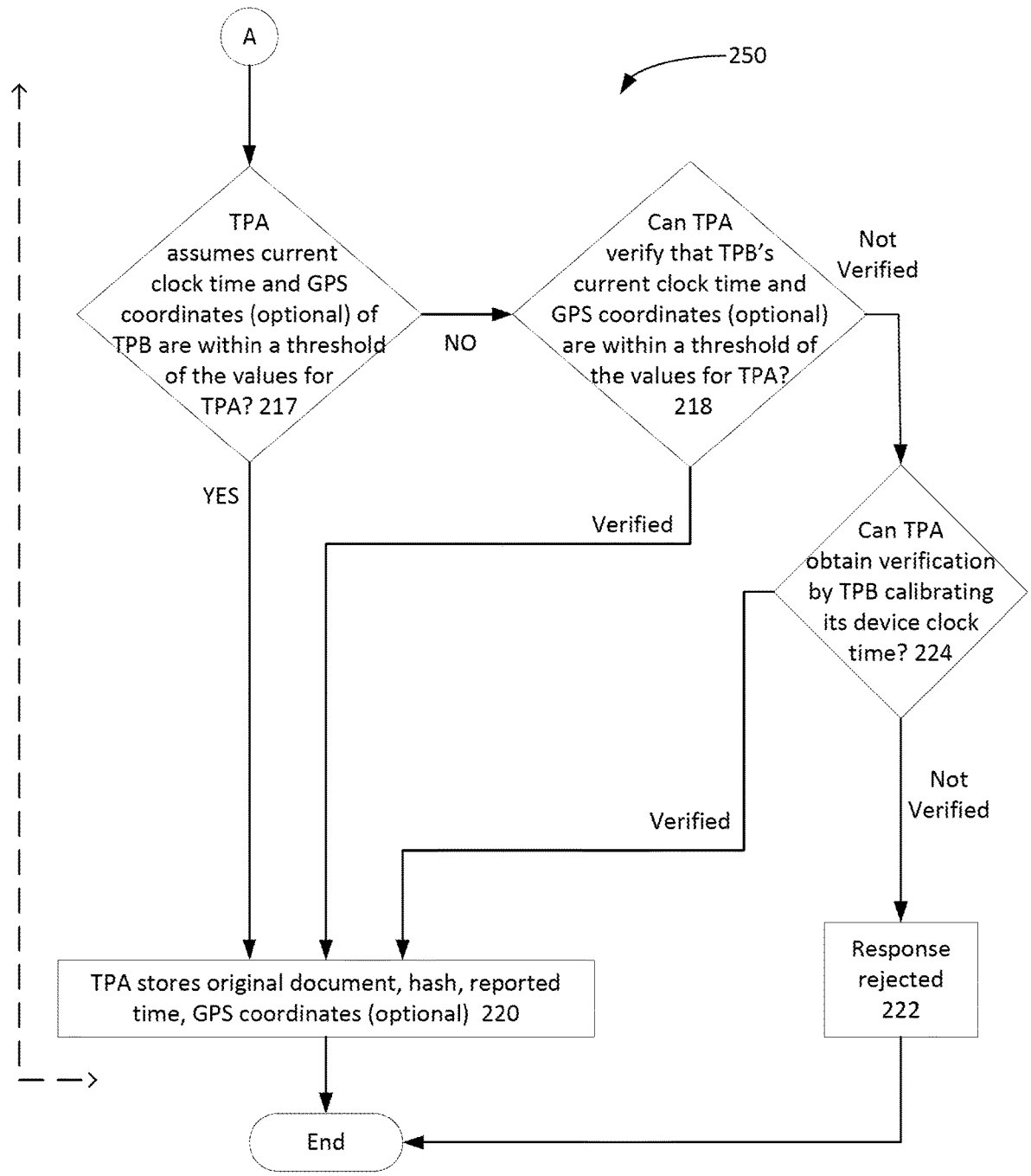

In an exemplary embodiment 200 and 250, FIGS. 2A and 2B illustrate a flowchart for a method of a document exchange and validation based on a non-repudiation protocol and a time-based one time password (TOTP) for encryption. The method comprises the following steps:

TPB 106 registers an application (App) with TTP 102 (step 202)

TTP 102 generates an initial "seed" based in part on a current time & sends initial "seed" to TPB 106 (step 204).

Steps 202 and 204 are only needed during one time registration.

TPA 104 sends a document to TPB 106. (step 206)

The user of TPB 106 reviews document (step 208)

Is the document acceptable to the user of TPB 106? (step 210). If yes, TPB 106 computes the current TOTP based on the current time and initial "seed" (step 213)

Subsequently, TPB 106 computes hash of the document using TOTP as encryption key. (step 214), and TPB 106 sends hash, current clock time, and GPS coordinates (may be optional) to TPA 104. (step 216)

If TPA 104 assumes that the current clock time and GPS coordinates (optional) of TPB 106 are within a threshold of the values for TPA 104, then TPA 104 stores the original document, hash, reported the hash was calculated, and the GPS coordinates (optional) (steps 217, 220).

If TPA 104 does not assumes that the current clock time and GPS coordinates (optional) of TPB 106 are within a threshold of the values for TPA 104, then TPA 104, then TPA 104 attempts to verify that TPB 106's current clock time and GPS coordinates (optional) are within a threshold of the values for TPA 104. (step 218)

If TPA 104 verifies that TPB 106's current clock time and GPS coordinates (optional) are within a threshold of the values for TPA 104, then TPA 104 stores the original document, hash, reported the hash was calculated, and the GPS coordinates (optional) (steps 218, 220)

If TPA 104 cannot verify that TPB 106's current clock time and GPS coordinates (optional) are within a threshold of the values for TPA 104, then TPA 104 sends a message to TPB 106, and TPB 106 proceeds to calibrate its device clock time. (step 224)

If after calibration, TPA 104 can verify that TPB 106's current clock time and GPS coordinates (optional) are within a threshold of the values for TPA 104, TPA 104 proceeds to store the original document, hash, reported the hash was calculated, and the GPS coordinates (optional) (steps 224, 220)

If after calibration, TPA 104 can not verify that TPB 106's current clock time and GPS coordinates (optional) are within a threshold of the values for TPA 104, the response from TPB 106 is rejected and the method ends. (step 222)

If the document is not acceptable in step 210, TPB 106 sends document to TPA 104 for correction. (step 212) The user of TPA 104 can modify the document using the computing device and regenerate the document to match the details of the actual event, e.g. the goods delivered.

The acceptability of a document is equivalent to a manual determination that the user of TPB 106 (e.g. first user) is ready to sign and accept a document. The user of TPB 106 verifies that the invoice states that all the products on the invoice were received by the user of TPB 106. The user of TPB 106 then proceeds and signs and accepts the document. That is, the entries in the document are correct and are acceptable to the user of TPB 106. For example: if the document is an invoice of the all the products that have been delivered by the user of TPA 104 to the user of TPB 106, then the user of TPB 106 verifies that fact before accepting the document.

Figure 3:
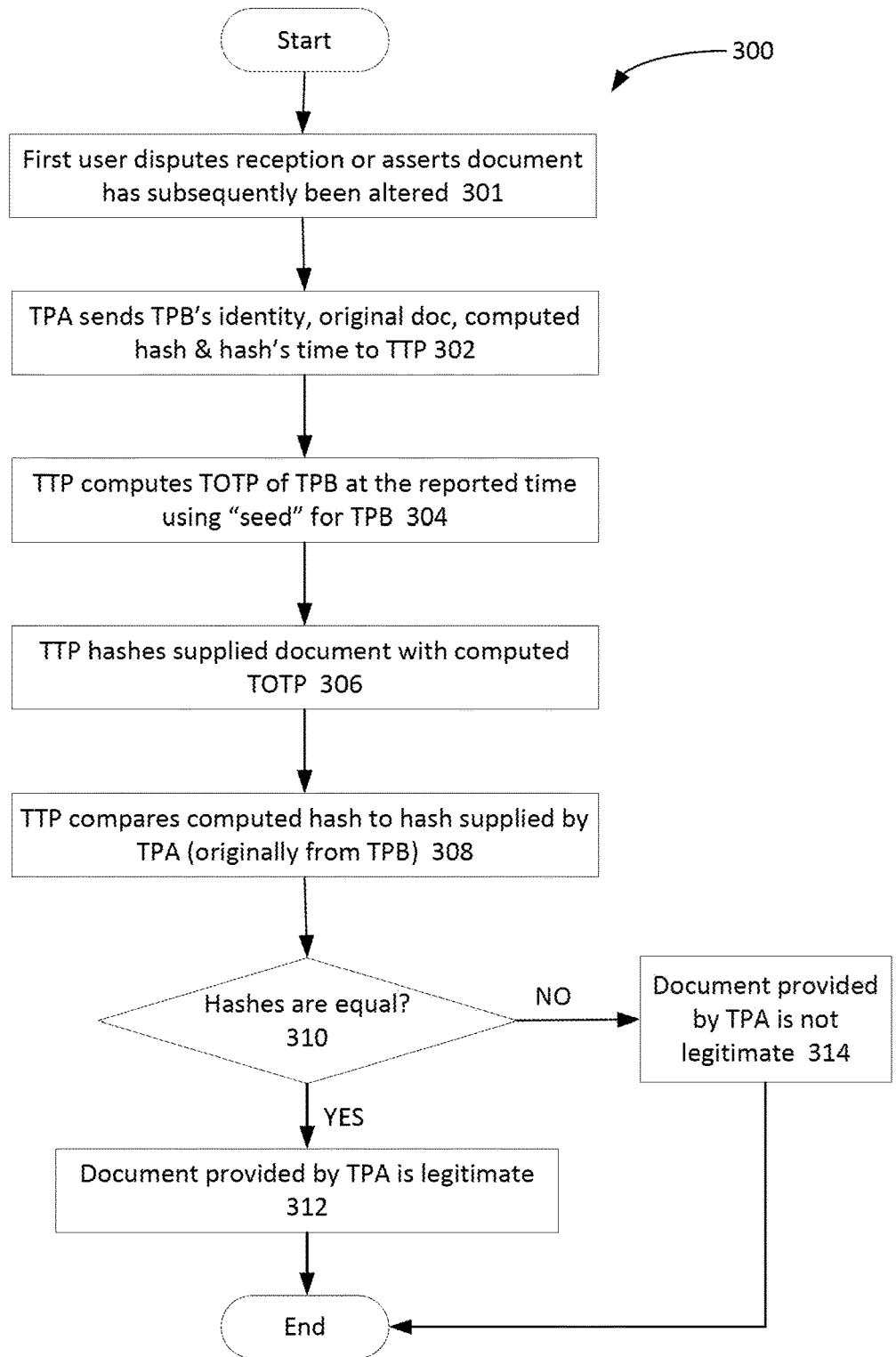
FIG. 3 illustrates a flowchart for a method of dispute resolution between two trading partners.

In an exemplary embodiment 300, FIG. 3 illustrates a flowchart for a method of dispute resolution between two trading partners, such as the user of TPA 104 and the user of TPB 106. The method comprises the steps of:

The user of TPB 106 disputes reception or asserts document has subsequently been altered. (step 301)

TPA 104 transmits TPB 106's identity, original document, computed hash & hash's time to TTP 102. (step 302)

TTP 102 computes TOTP of TPB 106 at the reported time using "seed" for TPB 106. (step 304)

TTP 102 hashes supplied document with computed TOTP. (step 306)

TTP 102 compares computed hash to hash supplied by TPA 104 (originally from TPB 106). (step 308)

Are the hashes equal? (step 310) If yes, the document is legitimate. (step 312) If no, the document is not legitimate. (step 314)

In another exemplary embodiment, a method for a third party to verify a communication transmitted from a second device to a first device without the communication being transmitted via the third party comprises the steps of: (1) in response to receiving a registration request from the first device, sending a unique seed to the first device; and (2) in response to receiving a dispute request from the first device comprising a communication transmitted to the first device by the second device and a first hash and a time transmitted to the second device from the first device in response to the communication: (i) creating a time-based one time password (TOTP) using the time and unique seed (ii) creating a second hash of the communication using the TOTP; (iii) comparing the first and second hashes; and (iv) verifying the communication was received by the second device if the first and second hashed are equal. Additionally, transmitting, with the first device to the second device the GPS coordinates of the first device; and receiving, with the first device, a verification from the second device that the GPS coordinates of the first device are within a threshold of the second device's current GPS coordinates. Alternatively, receiving, with the first device, a rejection from the second device indicating that the GPS coordinates of the first device are not within a threshold of GPS coordinates of the second device. Additionally, the digital signature comprises one or more of the following: evidence, identify, document status, acknowledgement of informed consent by signer.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;

U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; 8,740,082;
U.S. Pat. Nos. 8,740,085; 8,746,563;
U.S. Pat. Nos. 8,750,445; 8,752,766;
U.S. Pat. Nos. 8,756,059; 8,757,495;
U.S. Pat. Nos. 8,760,563; 8,763,909;
U.S. Pat. Nos. 8,777,108; 8,777,109;
U.S. Pat. Nos. 8,779,898; 8,781,520;
U.S. Pat. Nos. 8,783,573; 8,789,757;
U.S. Pat. Nos. 8,789,758; 8,789,759;
U.S. Pat. Nos. 8,794,520; 8,794,522;
U.S. Pat. Nos. 8,794,525; 8,794,526;
U.S. Pat. Nos. 8,798,367; 8,807,431;
U.S. Pat. Nos. 8,807,432; 8,820,630;
U.S. Pat. Nos. 8,822,848; 8,824,692;
U.S. Pat. Nos. 8,824,696; 8,842,849;
U.S. Pat. Nos. 8,844,822; 8,844,823;
U.S. Pat. Nos. 8,849,019; 8,851,383;
U.S. Pat. Nos. 8,854,633; 8,866,963;
U.S. Pat. Nos. 8,868,421; 8,868,519;
U.S. Pat. Nos. 8,868,802; 8,868,803;
U.S. Pat. Nos. 8,870,074; 8,879,639;
U.S. Pat. Nos. 8,880,426; 8,881,983;
U.S. Pat. Nos. 8,881,987; 8,903,172;
U.S. Pat. Nos. 8,908,995; 8,910,870;
U.S. Pat. Nos. 8,910,875; 8,914,290;
U.S. Pat. Nos. 8,914,788; 8,915,439;
U.S. Pat. Nos. 8,915,444; 8,916,789;
U.S. Pat. Nos. 8,918,250; 8,918,564;
U.S. Pat. Nos. 8,925,818; 8,939,374;
U.S. Pat. Nos. 8,942,480; 8,944,313;
U.S. Pat. Nos. 8,944,327; 8,944,332;
U.S. Pat. Nos. 8,950,678; 8,967,468;
U.S. Pat. Nos. 8,971,346; 8,976,030;
U.S. Pat. Nos. 8,976,368; 8,978,981;
U.S. Pat. Nos. 8,978,983; 8,978,984;
U.S. Pat. Nos. 8,985,456; 8,985,457;
U.S. Pat. Nos. 8,985,459; 8,985,461;
U.S. Pat. Nos. 8,988,578; 8,988,590;
U.S. Pat. Nos. 8,991,704; 8,996,194;
U.S. Pat. Nos. 8,996,384; 9,002,641;
U.S. Pat. Nos. 9,007,368; 9,010,641;
U.S. Pat. Nos. 9,015,513; 9,016,576;
U.S. Pat. Nos. 9,022,288; 9,030,964;
U.S. Pat. Nos. 9,033,240; 9,033,242;
U.S. Pat. Nos. 9,036,054; 9,037,344;
U.S. Pat. Nos. 9,038,911; 9,038,915;
U.S. Pat. Nos. 9,047,098; 9,047,359;
U.S. Pat. Nos. 9,047,420; 9,047,525;
U.S. Pat. Nos. 9,047,531; 9,053,055;
U.S. Pat. Nos. 9,053,378; 9,053,380;
U.S. Pat. Nos. 9,058,526; 9,064,165;
U.S. Pat. Nos. 9,064,165; 9,064,167;
U.S. Pat. Nos. 9,064,168; 9,064,254;
U.S. Pat. Nos. 9,066,032; 9,070,032;
U.S. Pat. Nos. 9,076,459; 9,079,423;
U.S. Pat. Nos. 9,080,856; 9,082,023;
U.S. Pat. Nos. 9,082,031; 9,084,032;
U.S. Pat. Nos. 9,087,250; 9,092,681;
U.S. Pat. Nos. 9,092,682; 9,092,683;
U.S. Pat. Nos. 9,093,141; 9,098,763;
U.S. Pat. Nos. 9,104,929; 9,104,934;
U.S. Pat. Nos. 9,107,484; 9,111,159;
U.S. Pat. Nos. 9,111,166; 9,135,483;
U.S. Pat. Nos. 9,137,009; 9,141,839;
U.S. Pat. Nos. 9,147,096; 9,148,474;
U.S. Pat. Nos. 9,158,000; 9,158,340;
U.S. Pat. Nos. 9,158,953; 9,159,059;
U.S. Pat. Nos. 9,165,174; 9,171,543;
U.S. Pat. Nos. 9,183,425; 9,189,669;
U.S. Pat. Nos. 9,195,844; 9,202,458;
U.S. Pat. Nos. 9,208,366; 9,208,367;
U.S. Pat. Nos. 9,219,836; 9,224,024;
U.S. Pat. Nos. 9,224,027; 9,230,140;
U.S. Pat. Nos. 9,235,553; 9,239,950;
U.S. Pat. Nos. 9,245,492; 9,248,640;
U.S. Pat. Nos. 9,250,652; 9,250,712;
U.S. Pat. Nos. 9,251,411; 9,258,033;
U.S. Pat. Nos. 9,262,633; 9,262,660;
U.S. Pat. Nos. 9,262,662; 9,269,036;
U.S. Pat. Nos. 9,270,782; 9,274,812;
U.S. Pat. Nos. 9,275,388; 9,277,668;
U.S. Pat. Nos. 9,280,693; 9,286,496;
U.S. Pat. Nos. 9,298,964; 9,301,427;
U.S. Pat. Nos. 9,313,377; 9,317,037;
U.S. Pat. Nos. 9,319,548; 9,342,723;
U.S. Pat. Nos. 9,361,882; 9,365,381;
U.S. Pat. Nos. 9,373,018; 9,375,945;
U.S. Pat. Nos. 9,378,403; 9,383,848;
U.S. Pat. Nos. 9,384,374; 9,390,304;
U.S. Pat. Nos. 9,390,596; 9,411,386;
U.S. Pat. Nos. 9,412,242; 9,418,269;
U.S. Pat. Nos. 9,418,270; 9,465,967;
U.S. Pat. Nos. 9,423,318; 9,424,454;
U.S. Pat. Nos. 9,436,860; 9,443,123;
U.S. Pat. Nos. 9,443,222; 9,454,689;
U.S. Pat. Nos. 9,464,885; 9,465,967;
U.S. Pat. Nos. 9,478,983; 9,481,186;
U.S. Pat. Nos. 9,487,113; 9,488,986;
U.S. Pat. Nos. 9,489,782; 9,490,540;

U.S. Pat. Nos. 9,491,729; 9,497,092;
U.S. Pat. Nos. 9,507,974; 9,519,814;
U.S. Pat. Nos. 9,521,331; 9,530,038;
U.S. Pat. Nos. 9,572,901; 9,558,386;
U.S. Pat. Nos. 9,606,581; 9,646,189;
U.S. Pat. Nos. 9,646,191; 9,652,648;
U.S. Pat. Nos. 9,652,653; 9,656,487;
U.S. Pat. Nos. 9,659,198; 9,680,282;
U.S. Pat. Nos. 9,697,401; 9,701,140;
U.S. Design Pat. No. D702,237;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D734,339;
U.S. Design Pat. No. D737,321;
U.S. Design Pat. No. D754,205;
U.S. Design Pat. No. D754,206;
U.S. Design Pat. No. D757,009;
U.S. Design Pat. No. D760,719;
U.S. Design Pat. No. D762,604;
U.S. Design Pat. No. D766,244;
U.S. Design Pat. No. D777,166;
U.S. Design Pat. No. D771,631;
U.S. Design Pat. No. D783,601;
U.S. Design Pat. No. D785,617;
U.S. Design Pat. No. D785,636;
U.S. Design Pat. No. D790,505;
U.S. Design Pat. No. D790,546;
International Publication No. 2013/163789;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0194692;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0332996;
U.S. Patent Application Publication No. 2014/0001267;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131443;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0191684;
U.S. Patent Application Publication No. 2014/0191913;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0231500;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0332590;
U.S. Patent Application Publication No. 2014/0351317;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0009338;
U.S. Patent Application Publication No. 2015/0014416;
U.S. Patent Application Publication No. 2015/0021397;
U.S. Patent Application Publication No. 2015/0028104;
U.S. Patent Application Publication No. 2015/0029002;
U.S. Patent Application Publication No. 2015/0032709;

U.S. Patent Application Publication No. 2015/0039309;
U.S. Patent Application Publication No. 2015/0039878;
U.S. Patent Application Publication No. 2015/0040378;
U.S. Patent Application Publication No. 2015/0049347;
U.S. Patent Application Publication No. 2015/0051992;
U.S. Patent Application Publication No. 2015/0053769;
U.S. Patent Application Publication No. 2015/0062366;
U.S. Patent Application Publication No. 2015/0063215;
U.S. Patent Application Publication No. 2015/0088522;
U.S. Patent Application Publication No. 2015/0096872;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0149946;
U.S. Patent Application Publication No. 2015/0161429;
U.S. Patent Application Publication No. 2015/0178523;
U.S. Patent Application Publication No. 2015/0178537;
U.S. Patent Application Publication No. 2015/0178685;
U.S. Patent Application Publication No. 2015/0181109;
U.S. Patent Application Publication No. 2015/0199957;
U.S. Patent Application Publication No. 2015/0210199;
U.S. Patent Application Publication No. 2015/0212565;
U.S. Patent Application Publication No. 2015/0213647;
U.S. Patent Application Publication No. 2015/0220753;
U.S. Patent Application Publication No. 2015/0220901;
U.S. Patent Application Publication No. 2015/0227189;
U.S. Patent Application Publication No. 2015/0236984;
U.S. Patent Application Publication No. 2015/0239348;
U.S. Patent Application Publication No. 2015/0242658;
U.S. Patent Application Publication No. 2015/0248572;
U.S. Patent Application Publication No. 2015/0254485;
U.S. Patent Application Publication No. 2015/0261643;
U.S. Patent Application Publication No. 2015/0264624;
U.S. Patent Application Publication No. 2015/0268971;
U.S. Patent Application Publication No. 2015/0269402;
U.S. Patent Application Publication No. 2015/0288689;
U.S. Patent Application Publication No. 2015/0288896;
U.S. Patent Application Publication No. 2015/0310243;
U.S. Patent Application Publication No. 2015/0310244;
U.S. Patent Application Publication No. 2015/0310389;
U.S. Patent Application Publication No. 2015/0312780;
U.S. Patent Application Publication No. 2015/0327012;
U.S. Patent Application Publication No. 2016/0014251;
U.S. Patent Application Publication No. 2016/0025697;
U.S. Patent Application Publication No. 2016/0026838;
U.S. Patent Application Publication No. 2016/0026839;
U.S. Patent Application Publication No. 2016/0040982;
U.S. Patent Application Publication No. 2016/0042241;
U.S. Patent Application Publication No. 2016/0057230;
U.S. Patent Application Publication No. 2016/0062473;
U.S. Patent Application Publication No. 2016/0070944;
U.S. Patent Application Publication No. 2016/0092805;
U.S. Patent Application Publication No. 2016/0101936;
U.S. Patent Application Publication No. 2016/0104019;
U.S. Patent Application Publication No. 2016/0104274;
U.S. Patent Application Publication No. 2016/0109219;
U.S. Patent Application Publication No. 2016/0109220;
U.S. Patent Application Publication No. 2016/0109224;
U.S. Patent Application Publication No. 2016/0112631;
U.S. Patent Application Publication No. 2016/0112643;
U.S. Patent Application Publication No. 2016/0117627;
U.S. Patent Application Publication No. 2016/0124516;
U.S. Patent Application Publication No. 2016/0125217;
U.S. Patent Application Publication No. 2016/0125342;
U.S. Patent Application Publication No. 2016/0125873;
U.S. Patent Application Publication No. 2016/0133253;
U.S. Patent Application Publication No. 2016/0171597;
U.S. Patent Application Publication No. 2016/0171666;
U.S. Patent Application Publication No. 2016/0171720;
U.S. Patent Application Publication No. 2016/0171775;
U.S. Patent Application Publication No. 2016/0171777;
U.S. Patent Application Publication No. 2016/0174674;
U.S. Patent Application Publication No. 2016/0178479;
U.S. Patent Application Publication No. 2016/0178685;
U.S. Patent Application Publication No. 2016/0178707;
U.S. Patent Application Publication No. 2016/0179132;
U.S. Patent Application Publication No. 2016/0179143;
U.S. Patent Application Publication No. 2016/0179368;
U.S. Patent Application Publication No. 2016/0179378;
U.S. Patent Application Publication No. 2016/0180130;
U.S. Patent Application Publication No. 2016/0180133;
U.S. Patent Application Publication No. 2016/0180136;
U.S. Patent Application Publication No. 2016/0180594;
U.S. Patent Application Publication No. 2016/0180663;
U.S. Patent Application Publication No. 2016/0180678;
U.S. Patent Application Publication No. 2016/0180713;
U.S. Patent Application Publication No. 2016/0185136;
U.S. Patent Application Publication No. 2016/0185291;
U.S. Patent Application Publication No. 2016/0186926;
U.S. Patent Application Publication No. 2016/0188861;
U.S. Patent Application Publication No. 2016/0188939;
U.S. Patent Application Publication No. 2016/0188940;
U.S. Patent Application Publication No. 2016/0188941;
U.S. Patent Application Publication No. 2016/0188942;
U.S. Patent Application Publication No. 2016/0188943;
U.S. Patent Application Publication No. 2016/0188944;
U.S. Patent Application Publication No. 2016/0189076;
U.S. Patent Application Publication No. 2016/0189087;
U.S. Patent Application Publication No. 2016/0189088;
U.S. Patent Application Publication No. 2016/0189092;
U.S. Patent Application Publication No. 2016/0189284;
U.S. Patent Application Publication No. 2016/0189288;
U.S. Patent Application Publication No. 2016/0189366;
U.S. Patent Application Publication No. 2016/0189443;
U.S. Patent Application Publication No. 2016/0189447;
U.S. Patent Application Publication No. 2016/0189489;
U.S. Patent Application Publication No. 2016/0192051;
U.S. Patent Application Publication No. 2016/0202951;
U.S. Patent Application Publication No. 2016/0202958;
U.S. Patent Application Publication No. 2016/0202959;
U.S. Patent Application Publication No. 2016/0203021;
U.S. Patent Application Publication No. 2016/0203429;
U.S. Patent Application Publication No. 2016/0203797;
U.S. Patent Application Publication No. 2016/0203820;
U.S. Patent Application Publication No. 2016/0204623;
U.S. Patent Application Publication No. 2016/0204636;
U.S. Patent Application Publication No. 2016/0204638;
U.S. Patent Application Publication No. 2016/0227912;
U.S. Patent Application Publication No. 2016/0232891;
U.S. Patent Application Publication No. 2016/0292477;
U.S. Patent Application Publication No. 2016/0294779;
U.S. Patent Application Publication No. 2016/0306769;
U.S. Patent Application Publication No. 2016/0314276;
U.S. Patent Application Publication No. 2016/0314294;
U.S. Patent Application Publication No. 2016/0316190;
U.S. Patent Application Publication No. 2016/0323310;

U.S. Patent Application Publication No. 2016/0325677;
U.S. Patent Application Publication No. 2016/0327614;
U.S. Patent Application Publication No. 2016/0327930;
U.S. Patent Application Publication No. 2016/0328762;
U.S. Patent Application Publication No. 2016/0330218;
U.S. Patent Application Publication No. 2016/0343163;
U.S. Patent Application Publication No. 2016/0343176;
U.S. Patent Application Publication No. 2016/0364914;
U.S. Patent Application Publication No. 2016/0370220;
U.S. Patent Application Publication No. 2016/0372282;
U.S. Patent Application Publication No. 2016/0373847;
U.S. Patent Application Publication No. 2016/0377414;
U.S. Patent Application Publication No. 2016/0377417;
U.S. Patent Application Publication No. 2017/0010141;
U.S. Patent Application Publication No. 2017/0010328;
U.S. Patent Application Publication No. 2017/0010780;
U.S. Patent Application Publication No. 2017/0016714;
U.S. Patent Application Publication No. 2017/0018094;
U.S. Patent Application Publication No. 2017/0046603;
U.S. Patent Application Publication No. 2017/0047864;
U.S. Patent Application Publication No. 2017/0053146;
U.S. Patent Application Publication No. 2017/0053147;
U.S. Patent Application Publication No. 2017/0053647;
U.S. Patent Application Publication No. 2017/0055606;
U.S. Patent Application Publication No. 2017/0060316;
U.S. Patent Application Publication No. 2017/0061961;
U.S. Patent Application Publication No. 2017/0064634;
U.S. Patent Application Publication No. 2017/0083730;
U.S. Patent Application Publication No. 2017/0091502;
U.S. Patent Application Publication No. 2017/0091706;
U.S. Patent Application Publication No. 2017/0091741;
U.S. Patent Application Publication No. 2017/0091904;
U.S. Patent Application Publication No. 2017/0092908;
U.S. Patent Application Publication No. 2017/0094238;
U.S. Patent Application Publication No. 2017/0098947;
U.S. Patent Application Publication No. 2017/0100949;
U.S. Patent Application Publication No. 2017/0108838;
U.S. Patent Application Publication No. 2017/0108895;
U.S. Patent Application Publication No. 2017/0118355;
U.S. Patent Application Publication No. 2017/0123598;
U.S. Patent Application Publication No. 2017/0124369;
U.S. Patent Application Publication No. 2017/0124396;
U.S. Patent Application Publication No. 2017/0124687;
U.S. Patent Application Publication No. 2017/0126873;
U.S. Patent Application Publication No. 2017/0126904;
U.S. Patent Application Publication No. 2017/0139012;
U.S. Patent Application Publication No. 2017/0140329;
U.S. Patent Application Publication No. 2017/0140731;
U.S. Patent Application Publication No. 2017/0147847;
U.S. Patent Application Publication No. 2017/0150124;
U.S. Patent Application Publication No. 2017/0169198;
U.S. Patent Application Publication No. 2017/0171035;
U.S. Patent Application Publication No. 2017/0171703;
U.S. Patent Application Publication No. 2017/0171803;
U.S. Patent Application Publication No. 2017/0180359;
U.S. Patent Application Publication No. 2017/0180577;
U.S. Patent Application Publication No. 2017/0181299;
U.S. Patent Application Publication No. 2017/0190192;
U.S. Patent Application Publication No. 2017/0193432;
U.S. Patent Application Publication No. 2017/0193461;
U.S. Patent Application Publication No. 2017/0193727;
U.S. Patent Application Publication No. 2017/0199266;
U.S. Patent Application Publication No. 2017/0200108; and
U.S. Patent Application Publication No. 2017/0200275.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for a third party device to verify a communication transmitted from a second device to a first device without the communication being transmitted via the third party device, the method comprising the steps of:
in response to receiving a registration request from the first device, sending, by the third party device, a unique seed to the first device;
receiving, by the third party device, (i) a dispute request from the first device, the dispute request comprising the communication transmitted to the first device by the second device, (ii) a clock time of the first device when the first device transmitted the dispute request in response to the communication, and (iii) a first hash of the communication computed using a first time-based one time password (TOTP) that is created, by the first device, based on a current clock time of the first device and the unique seed; and
in response to receiving the dispute request:
creating, by the third party device, a second TOTP using the current clock time and the unique seed;
creating, by the third party device, a second hash of the communication using the second TOTP;
comparing, by the third party device, the first hash and the second hash; and
verifying, by the third party device, the communication is received from the second device if the first hash and the second hash are equal.

2. The method according to claim 1, wherein:
transmitting, by the first device, to the second device GPS coordinates of the first device; and
receiving, by the first device, a verification from the second device that the GPS coordinates of the first device are within a threshold of second device's current GPS coordinates.

3. The method according to claim 1, wherein:
capabilities of the first device and the second device are equivalent, and the first device and the second device utilize the same application, and
after application registration neither the first device nor the second device access the third party device unless and until they have a dispute.

4. The method according to claim 1, wherein:
if the first hash and the second hash are equal, transmitting, by the third party device, an indication to the first device and the second device that the communication provided by the second device is legitimate.

5. The method according to claim 1, wherein a digital signature is generated based on the first hash.

6. The method according to claim 5, wherein the digital signature comprises one or more of the following: an evidence of origin, an identity, a document status, an acknowledgement of informed consent by a signer.

7. The method according to claim 5, wherein the digital signature utilizes asymmetric cryptography.

8. The method according to claim 1, wherein the clock time of the first device is calibrated using a phone time/network time protocol.

9. The method according to claim 1, wherein the communication is acceptable when a first user manually determines an accuracy of content of a document associated with the communication.

10. A method of implementing a non-repudiation protocol, the method comprising:
- registering, by a first device, an application associated with the first device at a third party device, wherein the application registration is a one-time event;
- receiving, by the first device, a seed generated by the third party device based in part on a seed time;
- receiving, by the first device, a document from a second device;
- displaying, by the first device, the received document to a first user;
- in response to receiving a first input from the first user indicating acceptance of the document, performing:
  - computing, by the first device, a first time-based one-time password based in part on a current clock time of the first device and the seed;
  - computing, by the first device, a first hash of the document using the first time-based one-time password as an encryption key;
  - transmitting, by the first device, to the second device the first hash and the current clock time when the first hash is computed by the first device, wherein the second device transmits the first hash and the current clock time to the third party device for computation of a second time-based one-time password; and
  - receiving an indication from the third party device indicating one of:
    - the document is legitimate, wherein the third party device determines that the document is legitimate when the first hash is equal to a second hash of the document that is computed using the second time-based one-time password; and
    - the document is not legitimate, wherein the third party device determines that the document is not legitimate when the first hash is not equal to the second hash; and
- in response to receiving a second input from the first user indicating non-acceptance of the document:
  - transmitting, by the first device, the document to the second device for correction.

11. The method according to claim 10, further comprising:
- transmitting, by the first device, to the second device GPS coordinates of the first device; and
- receiving, by the first device, a rejection from the second device indicating that the GPS coordinates of the first device are not within a threshold of GPS coordinates of the second device.

12. The method according to claim 10, further comprising:
- in response to the second device determining that the current clock time of the first device is within a threshold of a current clock time of the second device, storing, by the second device, the first hash and the current clock time when the first hash is computed by the first device, and
- in response to the second device determining that the current clock time of the first device is not within the threshold of the current clock time of the second device, measuring, by the second device, to verify that the current clock time of the first device is within the threshold of the current clock time of the second device.

13. The method according to claim 12, further comprising, in response to the second device failing to verify that the current clock time of the first device is within the threshold of the current clock time of the second device, calibrating, by the first device, the current clock time of the first device.

14. The method according to claim 12, further comprising, in response to the current clock time of the first device not being within the threshold of the current clock time of the second device, receiving, by the first device, a rejection from the second device.

15. The method according to claim 10, further comprising:
- receiving, by the third party device, from the second device an indication of a dispute, an identity of the first device, the document, the first hash, and the current clock time when the first hash is computed by the first device;
- computing, by the third party device, the second time-based one-time password based in part on the received current clock time when the first hash is computed by the first device;
- computing, by the third party device, the second hash of the document with the second time-based one-time password;
- comparing the first hash to the second hash; and
- if the first hash and the second hash are equal, transmitting, by the third party device, an indication to the first device and the second device that the document provided by the second device is legitimate.

16. The method according to claim 10, further comprising:
- receiving, by the trusted third party device, from the first device an indication of a dispute, a second document asserted by the second device as legitimate, the first hash, and the current clock time when the first hash is computed by the first device;
- computing, by the third party device, the second time-based one-time password based in part on the received current clock time when the first hash is computed by the first device;
- computing, by the third party device, the second hash of the second document with the second time-based one-time password;
- comparing the first hash to the second hash; and
- if the first hash and the second hash are equal, transmitting, by the third party device, an indication to the first device and the second device that the document provided by the second device is legitimate.

17. The method according to claim 10, further comprising, generating a digital signature based on the first hash.

18. The method according to claim 10, wherein the document is acceptable when the first user manually determines an accuracy of content of the document.

19. A method of implementing a non-repudiation protocol, the method comprising:
- receiving, by a first device, a request for a document from a second device;
- transmitting, by the first device, the document to the second device;
- receiving, by the first device, a hash and a current clock time when the hash is computed by the second device, wherein the second device computes a time-based one-time password based in part on the current clock time and a seed that is received from a third party device, and wherein the second device computes the hash of the document using the time-based one-time password as an encryption key;

verifying, by the first device, whether the current clock time of the second device is within a threshold of a current clock time of the first device;

in response to verifying that the current clock time of the second device is within the threshold of the current clock time of the first device, storing, by the first device, the document, the hash, and the current clock time when the hash is computed by the second device; and in response to failing to verify that the current clock time of the second device is within the threshold of the current clock time of the first device, calibrating, by the second device, the current clock time of the second device.

20. The method according to claim 19, further comprising receiving, by the second device, a rejection from the first device, in response to the current clock time of the second device not being within the threshold of the current clock time of the first device, post calibration.

\* \* \* \* \*